No. 854,892. PATENTED MAY 28, 1907.
H. D. JAMES.
SYSTEM OF CONTROL FOR ELECTRIC MOTORS.
APPLICATION FILED OCT. 3, 1905.

2 SHEETS—SHEET 1.

WITNESSES:
C. L. Belcher
Otto S. Schairer.

INVENTOR
Henry D. James
BY
ATTORNEY

No. 854,892. PATENTED MAY 28, 1907.
H. D. JAMES.
SYSTEM OF CONTROL FOR ELECTRIC MOTORS.
APPLICATION FILED OCT. 3, 1905.

2 SHEETS—SHEET 2.

WITNESSES:
C. L. Belcher
Otto S. Schauer

INVENTOR
Henry D. James
BY
Riley McCann
ATTORNEY

UNITED STATES PATENT OFFICE.

HENRY D. JAMES, OF PITTSBURG, PENNSYLVANIA, ASSIGNOR TO WESTINGHOUSE ELECTRIC & MANUFACTURING COMPANY, A CORPORATION OF PENNSYLVANIA.

SYSTEM OF CONTROL FOR ELECTRIC MOTORS.

No. 854,892.  Specification of Letters Patent.  Patented May 28, 1907.

Application filed October 3, 1905. Serial No. 281,188.

*To all whom it may concern:*

Be it known that I, HENRY D. JAMES, a citizen of the United States, and a resident of Pittsburg, in the county of Allegheny and State of Pennsylvania, have invented a new and useful Improvement in Systems of Control for Electric Motors, of which the following is a specification.

My invention relates to systems of control for electric motors that are applied to the operation of elevators, machine tools and similar devices.

The object of my invention is to provide simple and efficient means for arranging the motor circuits for forward and reverse rotation, for preventing reversal of direction of rotation of the motor while the same generates an electromotive force exceeding a predetermined amount, and for arranging the motor circuits to effect braking when the motor armature is disconnected from an external circuit.

Figure 1:
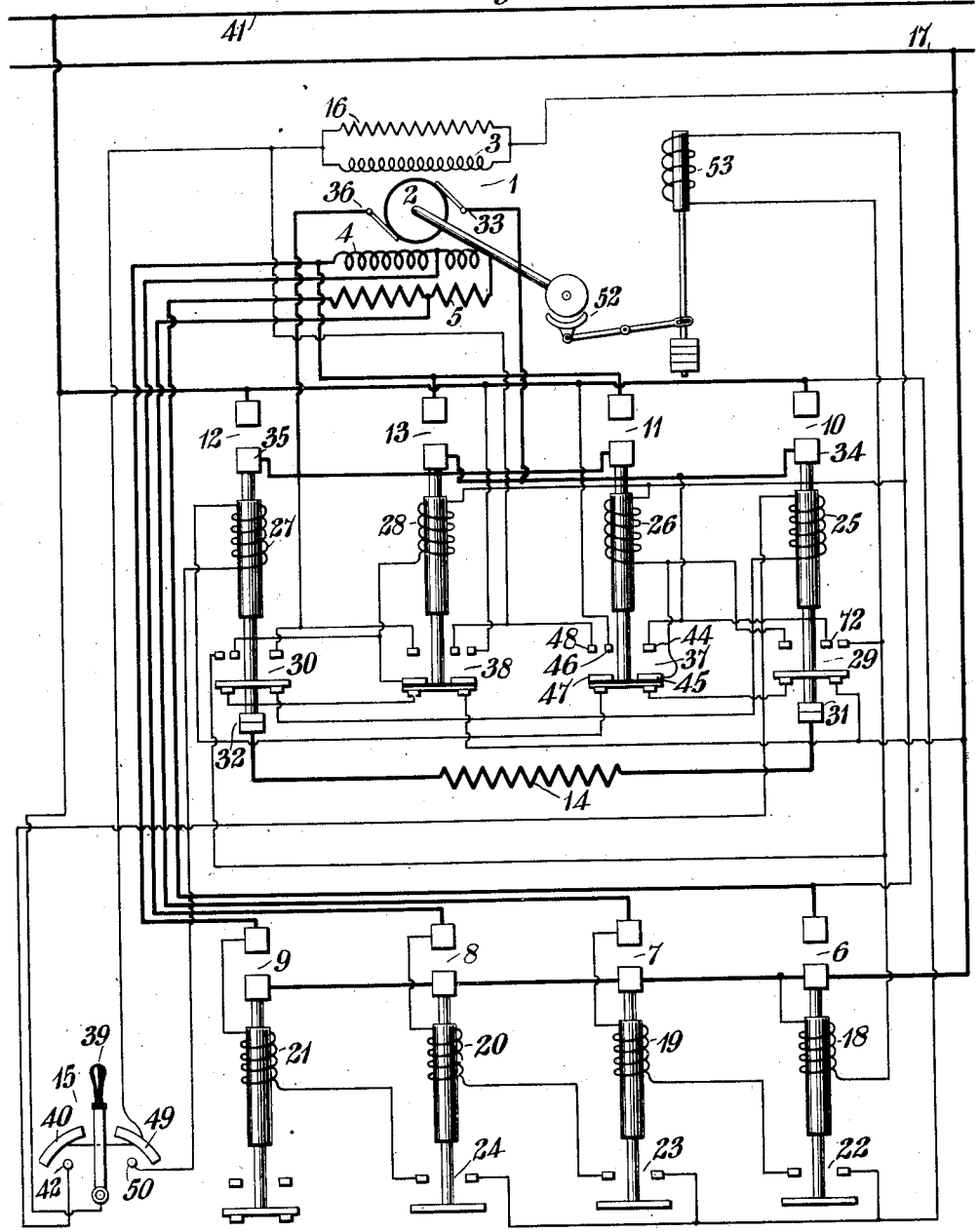
Figure 2:
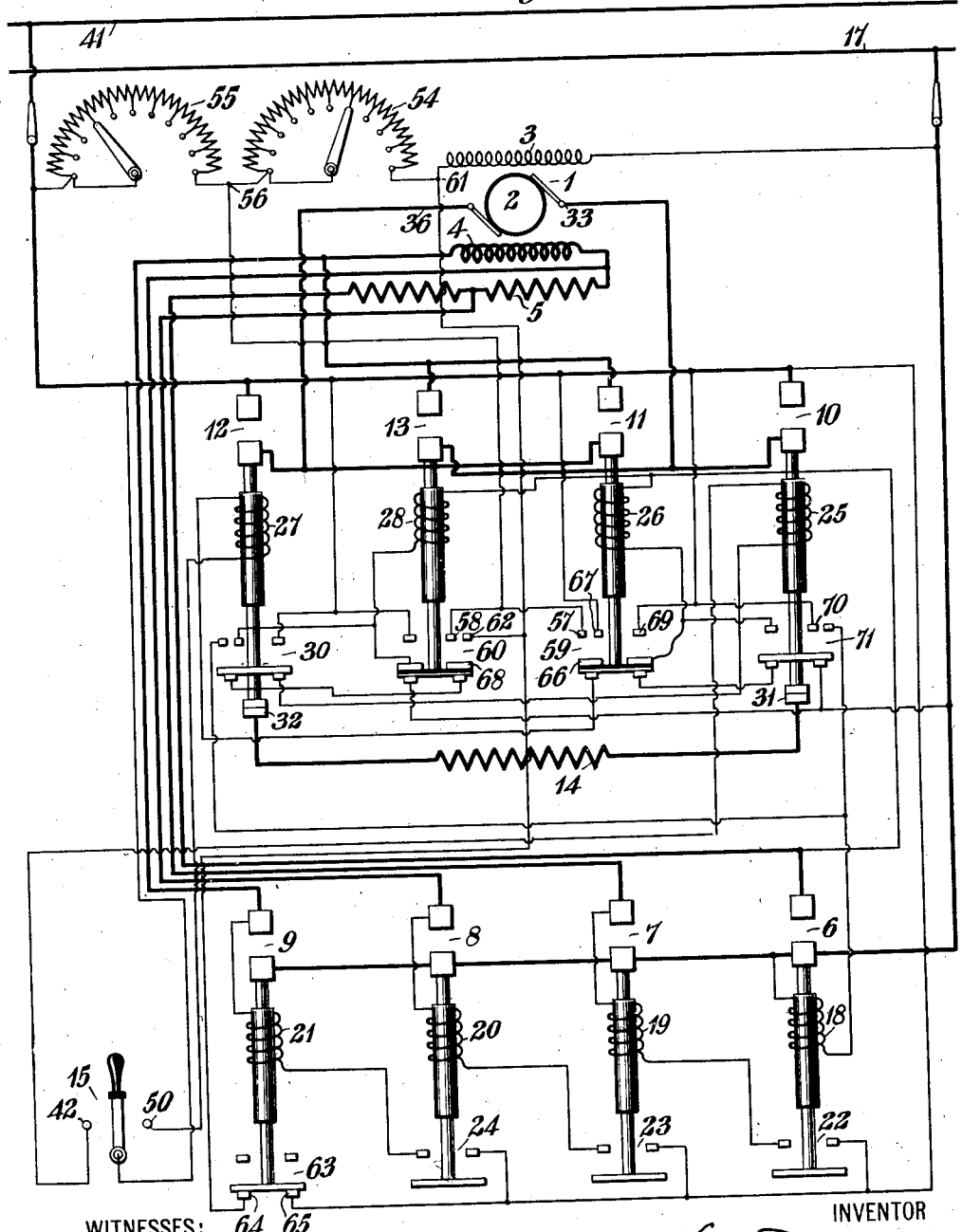

Figure 1 of the accompanying drawings illustrates diagrammatically a system of control embodying my invention and Fig. 2 illustrates diagrammatically a system that embodies a modification of that shown in Fig. 1.

The system comprises as its principal elements a motor 1 having an armature 2 and shunt and series field magnet windings 3 and 4 respectively, a starting resistance 5, switches 6, 7, 8 and 9 for removing the starting resistance and the series field magnet winding from the circuit, a pair of switches 10 and 11 respectively for arranging the armature circuit of the motor for forward rotation, a pair of switches 12 and 13 for arranging the armature circuit for reverse rotation, a braking resistance 14 that is connected in closed circuit with the armature 2 when the motor is not supplied with energy, and a master switch 15 whereby operation of the aforesaid switches may be controlled. A non-inductive resistance 16 may be arranged in shunt to the shunt field magnet winding 3 of the motor and may be permanently adjusted to provide a suitable path for the inductive discharge of the field upon its disconnection from the supply circuit.

The upper terminals of the switches 6 to 9, inclusive, are connected to suitable points in the starting resistance 5 and the series field magnet winding 4, and the lower terminals are connected together and to a supply conductor 17. The switches 6, 7, 8 and 9 are provided with operating magnet windings 18, 19, 20 and 21, respectively, the circuit of the winding 18 being governed by the master switch 15, and the switches 6, 7 and 8 are provided with interlocking switches 22, 23 and 24, respectively, whereby the switches 7, 8 and 9 are prevented from operation except in a predetermined order. The operating magnet windings 19, 20 and 21 are connected respectively between the upper terminals of the corresponding switches and terminals of the interlocking switches that are operated by the preceding switches, so that the switches 7, 8 and 9 may be closed only when the drops of potential over the portions of the circuit that are located between the switches have fallen below predetermined amounts. The arrangement of the circuits of this portion of the system is substantially like that shown and described in an application Serial No. 253,632, filed by me April 3, 1905, and for that reason a more detailed description herein is deemed unnecessary.

The switches 10 to 13, inclusive, whereby the circuits are arranged for either forward or reverse rotation, are provided, respectively, with operating magnet windings 25, 26, 27 and 28, the circuits of the windings 25 and 27 being governed primarily by the master switch 15. The switches 10 and 12 are also provided with interlocking switches 29 and 30, respectively, which serve to prevent the switches 10 and 11 from operating simultaneously with the switches 12 and 13 and vice versa, and which also serve to prevent completion of the circuits of the operating magnet windings 26 and 28 of the switches 11 and 13, respectively, until the corresponding switch 10 or 12 is closed. The switches 10 and 12 are also provided with auxiliary switches 31 and 32, which, when both the switches 10 and 12 are open, connect the braking resistance 14 in closed circuit with the armature 2. The circuit which is thus established is from terminal 33 of the armature 2, through contact terminal 34 of the switch 10, the switch 31, resistance 14, switch 32, contact terminal 35 of the switch 12, to terminal 36 of the motor armature.

The switches 11 and 13 are provided respectively with interlocking switches 37 and 38, which serve as additional means for preventing closure of the switches 10 and 11 simultaneously with the switches 12 and 13 and vice versa, and also to maintain the circuit of the shunt field magnet winding 3 while the electromotive force of the motor operating as a generator exceeds a predetermined amount, in a manner which will be hereinafter more fully described.

The operation of the system is as follows: When switch lever 39 of the master switch 15 is moved into engagement with conducting segment 40, a circuit is established from supply conductor 41, through switch lever 39, conducting segment 40, and shunt field magnet winding 3, to supply conductor 17. When the switch lever 39 is moved into engagement with contact terminal 42, a circuit is established from supply conductor 41 through switch lever 39, contact terminal 42, operating magnet winding 25, interlocking switches 30 and 38 in their lowermost positions, to supply conductor 17. Energizing of the winding 25 closes the switch 10 and raises the interlocking switch 29 to its uppermost position, a circuit being established by the latter switch from supply conductor 41, through switch 10, interlocking switch 29 and operating magnet winding 18, to supply conductor 17. The operating magnet winding 18, being energized, effects closure of the switch 6. Upon closure of the switch 6, another circuit is established from the supply conductor 41, through switch 10, interlocking switch 29, operating magnet winding 26 and switch 6 to supply conductor 17, the winding 26 being thereby energized and the switch 11 closed. The armature circuit of the motor 1 is then established from supply conductor 41 through switch 10, motor armature 2, switch 11, series field magnet winding 4, starting resistance 5 and switch 6, to supply conductor 17. The motor circuits are then arranged for forward rotation of the motor and the switches 7, 8 and 9 will close successively to effect removal from the circuit of the starting resistance 5 and the series field magnet winding 4 as the speed of the motor increases. If the switch lever 39 is returned to the position shown in full lines, the circuits of the operating magnet windings 18, 19, 20, 21 and 25 will be interrupted and the corresponding switches will open. The switch 31 will then be closed and the armature 2 connected, as before described, in closed circuit with the resistance 14. However, while the motor armature continues to rotate at an appreciable speed, the switch 11 will not open, since the operating magnet winding 26 is energized from the motor operating as a generator and the circuit of the shunt field magnet winding is thereby maintained closed. The circuit which supplies energy to the operating magnet winding 26 is from terminal 33 of the armature 2, through contact terminal 44, conducting strip 45 of the interlocking switch 37, operating magnet winding 26, starting resistance 5, series field magnet winding 4, and switch 11, to terminal 36 of the armature 2. As long as the motor armature 2 rotates at an appreciable speed, sufficient energy is supplied to the operating magnet winding 26 to maintain the switch 11 closed and the interlocking switch 37 in its uppermost position. The circuit of the shunt field magnet winding which is maintained is from the supply conductor 41, contact terminal 46, conducting strip 47, contact terminal 48 of the interlocking switch 37, and shunt field magnet winding 3, to the supply conductor 17. During the period that the motor operates as a generator, a dynamic brake is provided by the short-circuiting of the armature through the stopping resistance 14.

While the interlocking switch 37 is maintained in its uppermost position, operating magnet winding 27 of the switch 12 may not be energized even though the switch lever 39 is moved into engagement with conducting segment 49 and contact terminal 50. Establishing of the motor circuits for reverse rotation of the motor is thereby prevented until the interlocking switch 37 again occupies its lowermost position; that is, until the counter electromotive force of the motor has fallen below a predetermined amount. Operating magnet winding 25 may, however, be again energized if the switch lever 39 is moved to the right for the purpose of causing rotation of the motor in the same direction as before the circuits were interrupted. The switches 12 and 13 may be operated in a manner similar to that just described for the switches 10 and 11 if the switch lever 39 is moved to the left, and it is consequently deemed unnecessary to describe their operation more in detail. A mechanical brake 52 may also be provided for stopping the motor when it is disconnected from the external circuit, an operating magnet winding 53 for which is energized for the purpose of releasing the brake when the switches 6 and 10 are closed, the circuit thereby established being from the supply conductor 41, through switch 10, interlocking switch 29 in its uppermost position, brake magnet winding 53 and switch 6, to supply conductor 17.

It is frequently desired to operate motors that are applied to machine tools and similar devices at different speeds in forward and reverse directions of rotation, and my system, with but little modification, as shown in Fig. 2, provides such means.

Two rheostats 54 and 55 that are adjusted respectively for forward and reverse rotation of the motor are connected in series with the shunt field magnet winding 3. One terminal of the rheostat 55 is connected to line conductor 41 and the junction 56 of the rheostats is connected to contact terminals 57 and 58 respectively of interlocking switches 59 and 60, and the junction 61 of the rheostat 54 and the shunt field magnet winding 3 is connected to contact terminal 62 of the switch 60. The switch 9 is also provided with an interlocking switch 63, contact terminal 64 of which is connected to the junction 61 of rheostat 54 and the shunt field magnet winding 3, and contact terminal 65 of which is connected to supply conductor 41. This interlocking switch is provided for the purpose of shunting the rheostats 54 and 55 during starting and the initial stages of acceleration of the motor, or until all of the starting resistance 5 and the series field magnet winding 4 are removed from the circuit by the closing of the switch 9.

When the master switch lever 39 is moved into engagement with contact terminal 42 and the interlocking switch 59 is caused to occupy its uppermost position, the junction 56 of the rheostats 54 and 55 becomes connected with the supply conductor 41 by means of a circuit from the aforesaid junction, through contact terminal 57, conducting strip 66, and contact terminal 67, to the supply conductor 41. The rheostat 55 is thereby rendered ineffective, since both its terminals are connected to the same supply conductor, and if the interlocking switch 63 is open, the circuit of the shunt field magnet winding is then from supply conductor 41, through contact terminal 67, conducting segment 66, contact terminal 57, rheostat 54 and shunt field magnet winding 3, to the supply conductor 17.

If the master switch lever 39 is moved into engagement with contact terminals 50 and 51 and the switch 60 is caused to occupy its uppermost position, a circuit is established in shunt to the rheostat 54 from the junction 56, through contact terminal 58, conducting segment 68, contact terminal 62, to the junction 61 of the rheostat 54 and shunt field magnet winding 3, the rheostat 54 being thereby rendered ineffective. If the interlocking switch 63 is open, the circuit of the shunt field magnet winding is then from supply conductor 41, through rheostat 55, contact terminal 58, conducting segment 68, contact terminal 62 and the shunt field magnet winding 3, to the supply conductor 17.

Thus it is seen that in the system of Fig. 2 the interlocking switches 59 and 60 serve to connect the rheostat in circuit with the shunt field magnet winding which is adjusted for the corresponding direction of rotation.

It will be observed that in this latter system the segments 40 and 49 of the master switch 15 are omitted and the shunt field magnet winding is connected directly in circuit between the supply conductors 17 and 41. It is therefore effective for either forward or reverse rotation or for braking purposes.

It should also be noted that contact terminals 69 and 70 respectively of interlocking switches 59 and 71 are connected directly to supply conductor 41, whereas in the system of Fig. 1 corresponding contact terminals 44 and 72 are connected to terminal 34 of switch 10 by means of which it may be connected to the supply conductor 41. The connections for the interlocking switches that are operated by the other pair of reversing switches are in each case similar to those just described. In Fig. 2 the circuits are arranged as stated in order to prevent opening of the switches 11 and 13, if for any reason, such as imperfect operation, one or more of the switches 6 to 9, inclusive, remain closed after the circuits of their operating magnet windings have been interrupted. The operation of this portion of the system will be readily understood by tracing the circuit from supply conductor 41, through interlocking switch 59 in its uppermost position by way of contact terminal 69, operating magnet winding 26, more or less of the field magnet winding 4 and the resistance 5 and one or the other of the switches 6 to 9, inclusive, to supply conductor 17.

While the switches are represented as being operated electro-magnetically, it will be readily understood that they may be operated by any other suitable means, such as fluid-pressure, and that the operating magnet windings may serve only to control the operation of the switches, such as by governing the operation of the valves in the pneumatic circuits. The specific structural details of the devices shown form no part of the present invention and may comprise any of the suitable devices which have heretofore been provided or which may be invented in the future.

I do not intend to limit my invention to the specific arrangement of circuits, but desire to cover broadly means having substantially the same mode of operation for effecting the functions ascribed to the system.

I claim as my invention:

1. The combination with an electric motor, of two pairs of switches for connecting the motor armature respectively for forward and reverse rotation, the operation of the second switch of each pair being governed by that of the first, and means for preventing simultaneous closure of switches belonging to different pairs.

2. The combination with an electric motor, of two pairs of switches for connecting the motor armature respectively for forward and reverse rotation, the operation of the second switch of each pair being governed by that of the first.

3. The combination with an electric motor, of two pairs of switches for connecting the motor armature respectively for forward and reverse rotation and means for preventing closure of the second switch of each pair until after closure of the first.

4. The combination with an electric motor, of two pairs of switches for connecting the motor armature respectively for forward and reverse rotation, means for preventing closure of the second switch of each pair until after closure of the first and manually operated means for controlling operation of the first switch of each pair.

5. The combination with an electric motor, of two pairs of switches for connecting the motor armature respectively for forward and reverse rotation, of means for preventing closure of the second switch of each pair until after closure of the first and means for controlling operation of the first switch of each pair.

6. The combination with an electric motor, of two pairs of switches for connecting the motor armature respectively for forward and reverse rotation and means for preventing operation of the first switch of each pair when the non-corresponding second switch is closed.

7. The combination with an electric motor, a pair of switches for arranging the motor armature circuit for forward rotation, and another pair of switches for arranging the circuit for reverse rotation, of interlocking switches for preventing simultaneous closure of switches belonging to the different pairs, and interlocking switches for preventing closure of one switch of each pair until after closure of the other.

8. The combination with an electric motor, of two pairs of switches for connecting the motor armature respectively for forward and reverse rotation, the closing of the second switch of each pair being governed by the operation of the first, and means for preventing opening of the second switch of each pair while the electromotive force of the motor operating as a generator exceeds a predetermined amount.

9. The combination with an electric motor, of two pairs of switches for connecting the motor armature respectively for forward and reverse rotation, means for controlling operation of the first switch of each pair, means for preventing closure of the second switch of each pair until after closure of the first and means for preventing opening of the second switch of each pair while the electromotive force of the motor operating as a generator exceeds a predetermined amount.

10. The combination with an electric motor, of two pairs of switches for connecting the motor armature respectively for forward and reverse rotation, a resistance, and means for connecting the same in closed circuit with the motor armature when one switch of each pair is open.

11. The combination with a motor having an armature and a field magnet winding, of two pairs of separately actuated switches for connecting the motor armature respectively for forward and reverse rotation and means for maintaining the circuit of the field magnet winding while the speed of the motor exceeds a predetermined amount.

12. The combination with a motor having an armature and a field magnet winding, of two pairs of switches for connecting the motor armature respectively for forward and reverse rotation and means governed by said switches and dependent in operation upon the electromotive force of the motor when operating as a generator for maintaining the circuit of the field magnet winding while the said electromotive force exceeds a predetermined amount.

13. The combination with a motor having an armature and a field magnet winding, of two pairs of switches for connecting the motor armature respectively for forward and reverse rotation and means controlled by one switch of each pair for maintaining the circuit of the field magnet winding while the electromotive force of the motor operating as a generator exceeds a predetermined amount.

14. The combination with a motor having an armature and a field magnet winding, of two pairs of switches for connecting the motor armature respectively for forward and reverse rotation, means for controlling operation of the first switch of each pair, means for preventing closure of the second switch of each pair until after closure of the first and means controlled by the second switch of each pair for maintaining the circuit of the field magnet winding while the electromotive force of the motor operating as a generator exceeds a predetermined amount.

15. The combination with a motor having an armature and a field magnet winding, of two pairs of switches for connecting the motor armature respectively for forward and reverse rotation, means for controlling operation of the first switch of each pair, means for preventing operation of the first switch of each pair when a non-corresponding second switch is closed, means for maintaining the circuit of the field magnet winding while the speed of the motor exceeds a predetermined amount, a resistance, and means for connecting the same in closed circuit with the motor armature when the first switches of both pairs are open.

16. The combination with a motor having an armature and a field magnet winding, of two pairs of switches for connecting the motor armature respectively for forward and reverse rotation, a master switch whereby the circuit of the field magnet winding is established and then the first switch of one of the pairs caused to close, the operation of the second switch of each pair being governed by that of the first.

17. The combination with a motor having an armature and a field magnet winding, and resistances located in the circuit of the field magnet winding that are adjusted respectively for forward and reverse rotation of the motor, of two pairs of switches for connecting the motor armature respectively for forward and reverse rotation and means controlled by one of the switches of each pair for removing the resistance from the field magnet circuit which does not correspond with the direction of rotation of the motor.

18. The combination with a motor having an armature and a field magnet winding, and resistances located in the circuit of the field magnet winding that are adjusted respectively for forward and reverse rotation of the motor, of two pairs of switches for connecting the motor armature respectively for forward and reverse rotation, means for controlling the operation of the first switch of each pair, means for preventing closure of the second switch of each pair until after closure of the first, and means controlled by the second switch of each pair for removing the non-corresponding resistance from the circuit of the field magnet winding.

19. The combination with a motor having an armature and a field magnet winding, of two separate resistances in circuit with the field magnet winding that are adjusted respectively for forward and reverse rotation of the motor, means for further controlling the motor circuits and means for removing the resistances from the circuit of the field magnet winding until after completion of operation of the aforesaid means.

20. The combination with a motor having an armature and shunt and series field magnet windings, two separate resistances in circuit with the shunt field magnet winding that are adjusted respectively for forward and reverse rotation of the motor and a resistance in the armature circuit, of means for removing the resistance and series field magnet winding from the armature circuit and means for removing the resistances from the circuit of the shunt field magnet winding until after completion of operation of the aforesaid means.

21. The combination with an electric motor, of two pairs of switches for connecting the motor armature respectively for forward and reverse rotation, controlling magnet windings for the switches and means for preventing energizing of the controlling magnet winding of one of the switches of each pair until after closure of the other switch.

22. The combination with an electric motor, of two pairs of switches for connecting the motor armature respectively for forward and reverse rotation, controlling magnet windings therefor and auxiliary switches operated thereby which prevent closure of one of the switches of each pair until after closure of the other switch.

23. The combination with an electric motor, of two pairs of switches for connecting the motor armature respectively for forward and reverse rotation, controlling magnet windings therefor and auxiliary switches that are operated by one of the switches of each pair for preventing closure of the corresponding other switches until after operation thereof and for preventing simultaneous operation of the switches belonging to different pairs.

24. The combination with an electric motor, of two pairs of switches for connecting the motor armature respectively for forward and reverse rotation, controlling magnet windings therefor and auxiliary switches operated thereby for preventing closure of one of the switches of each pair until after closure of the other.

25. The combination with an electric motor, of two pairs of switches for connecting the motor armature respectively for forward and reverse rotation, controlling magnet windings therefor and auxiliary switches operated thereby for preventing closure of one of the switches of each pair until after closure of the other and for preventing opening of the second switch of each pair while the electromotive force of the motor operating as a generator exceeds a predetermined amount.

26. The combination with an electric motor, of two pairs of switches for connecting the motor armature respectively for forward and reverse rotation, controlling magnet windings therefor and auxiliary switches operated thereby for preventing energizing of the controlling magnet winding of one switch of each pair until after operation of the other switch and for preventing opening of the second switch of each pair while the electromotive force of the motor operating as a generator exceeds a predetermined amount.

27. The combination with an electric motor having an armature and field magnet winding, of two pairs of switches for connecting the motor armature respectively for forward and reverse rotation, controlling magnet windings therefor and auxiliary switches operated thereby for maintaining the circuit of the field magnet winding while the electromotive force operating as a generator exceeds a predetermined amount.

28. The combination with an electric motor having an armature and field magnet winding, of two pairs of switches for connecting the motor armature respectively for forward and reverse rotation, controlling magnet windings therefor and auxiliary switches operated thereby for preventing energizing of the controlling magnet of one of the switches of each pair until after closure of the other switch for preventing opening of the second switch and for maintaining the circuit of the field magnet winding while the electromotive force of the motor operating as a generator exceeds a predetermined amount.

29. The combination with an electric motor, of two pairs of switches for connecting the motor armature respectively for forward and reverse rotation, a resistance and auxiliary switches operated respectively by one of the main switches of each pair for connecting the resistance in closed circuit with the motor armature when the corresponding main switches are open.

30. The combination with a motor having an armature and a field magnet winding and resistances located in the circuit of the field magnet winding that are adjusted respectively for forward and reverse rotation of the motor, of two pairs of switches for connecting the motor armature respectively for forward and reverse rotation and auxiliary switches operated thereby for removing that resistance from the field circuit which is not adapted to the desired direction of rotation of the motor.

31. The combination with a motor having an armature and a field magnet winding, of two separate resistances in circuit with the field magnet winding that are adjusted respectively for forward and reverse rotation of the motor, means for further controlling the motor circuits and means for removing the resistances from the circuit of the field magnet winding until the motor attains a predetermined speed.

32. The combination with a motor having an armature and shunt and series field magnet windings, resistances in circuit with the shunt field magnet winding that are adjusted respectively for forward and reverse rotation of the motor and a resistance in the armature circuit, of switches for removing the resistance and the series field magnet winding from the armature circuit, and an interlocking switch operated by one of the aforesaid switches for shunting the resistances in the circuit of the shunt field magnet winding until the motor attains a predetermined speed.

33. The combination with a motor having an armature and a field magnet winding, of two separate resistances in circuit with the field magnet winding that are adjusted respectively for forward and reverse rotation of the motor, a set of switches for controlling the motor circuits and interlocking switches operated by switches of said set for removing that resistance from the field circuit which is not adapted to the desired direction of rotation of the motor.

34. The combination with an electric motor, of two pairs of switches for connecting the motor armature respectively for forward and reverse rotation, a set of switches for further controlling the motor circuits and means for preventing opening of the second switch of each pair while one or more of the said set of switches remains closed.

35. The combination with an electric motor, of two pairs of switches for connecting the motor armature respectively for forward and reverse rotation, means for preventing closure of the second switch of each pair until after closure of the first, a set of switches for further controlling the motor circuits and means for preventing opening of the second switch of each pair while one or more of the set of switches remains closed.

36. The combination with an electric motor, of two pairs of switches for connecting the motor armature respectively for forward and reverse rotation, a brake and means that are dependent in operation upon the first switch of each pair for controlling the same.

37. The combination with an electric motor, of two pairs of switches for connecting the motor armature respectively for forward and reverse rotation, a brake magnet winding and means that are operated by the first switch of each pair for controlling the circuit thereof.

38. The combination with an electric motor, of two pairs of switches for connecting the motor armature respectively for forward and reverse rotation, a brake and means for releasing the same while the first switch of each pair remains open.

39. The combination with an electric motor, of two pairs of separately actuated switches for connecting the motor armature respectively for forward and reverse rotation, a set of switches for further controlling the motor circuits and means for preventing closure of the first switch of said set until after closure of the first switch of one of said pairs.

40. The combination with an electric motor, of two pairs of switches for connecting the motor armature respectively for forward and reverse rotation, a set of switches for further controlling the motor circuits, means for preventing closure of the first switch of said set until after closure of the first switch of one of said pairs and means for preventing closure of the second switch of each pair until after closure of the first switch of said set.

41. The combination with an electric motor, of two pairs of switches for connecting the motor armature respectively for forward and reverse rotation, a set of switches for further controlling the motor circuits, a brake, means for preventing closure of the first switch of said set until after closure of the first switch of one of said pairs and means for preventing closure of the second switch of each of said pairs and release of the brake until after closure of the first switch of said set.

42. The combination with an electric motor, of two pairs of switches for connecting the motor armature respectively for forward and reverse rotation, a set of switches for further controlling the motor circuits, a brake, interlocking switches operated respectively by the first switch of each pair for preventing closure of the first switch of said set until after closure of the first switch of one of said pairs and means for preventing closure of the second switch of said pairs and release of the brake until after closure of the first switch of said set.

43. The combination with an electric motor, of two pairs of switches for connecting the motor armature respectively for forward and reverse rotation, a set of switches for further controlling the motor circuits and interlocking switches operated respectively by the first switches of said pairs for preventing closure of the first switch of said set until operation of the corresponding main switches.

In testimony whereof, I have hereunto subscribed my name this 30th day of September, 1905.

HENRY D. JAMES.

Witnesses:
  IDA W. REINECKE,
  BIRNEY HINES.